US010787032B2

(12) United States Patent
Yamazaki (10) Patent No.: US 10,787,032 B2
(45) Date of Patent: Sep. 29, 2020

(54) BICYCLE HUB

(71) Applicant: Shimano Inc., Sakai, Osaka (JP)

(72) Inventor: Azusa Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 204 days.

(21) Appl. No.: 15/790,589

(22) Filed: Oct. 26, 2017

(65) Prior Publication Data

US 2018/0170099 A1 Jun. 21, 2018

(30) Foreign Application Priority Data

Dec. 16, 2016 (JP) ................................ 2016-244708

(51) Int. Cl.
| | | |
|---|---|---|
| *B62M 6/65* | (2010.01) | |
| *B60B 27/02* | (2006.01) | |
| *B62M 6/50* | (2010.01) | |
| *B62J 6/12* | (2006.01) | |
| *B62M 6/90* | (2010.01) | |
| *B62K 25/02* | (2006.01) | |

(52) U.S. Cl.
CPC ............... *B60B 27/023* (2013.01); *B62J 6/12* (2013.01); *B62M 6/50* (2013.01); *B62M 6/65* (2013.01); *B62M 6/90* (2013.01); *B60L 2200/12* (2013.01); *B60L 2240/42* (2013.01); *B62K 25/02* (2013.01)

(58) Field of Classification Search
CPC . B60B 27/0015; B60B 27/068; B60B 27/023; B60B 27/047; B62M 6/65; B62M 6/90; B62M 6/50; B62J 6/12; B60L 2200/12
See application file for complete search history.

(56) References Cited

U.S. PATENT DOCUMENTS

| | | | | |
|---|---|---|---|---|
| 2,882,427 A | * | 4/1959 | Hils | B62J 6/12 310/67 R |
| 6,037,690 A | * | 3/2000 | Hill | B60B 27/023 310/168 |
| 7,042,123 B2 | * | 5/2006 | Kitamura | B62M 25/08 280/260 |
| 7,479,079 B2 | * | 1/2009 | Takeda | B62J 6/12 475/3 |

(Continued)

FOREIGN PATENT DOCUMENTS

| | | |
|---|---|---|
| CN | 105599857 A | 5/2016 |
| EP | 1 612 130 B1 | 10/2009 |

(Continued)

*Primary Examiner* — Steve Clemmons
(74) *Attorney, Agent, or Firm* — Global IP Counselors, LLP (57) ABSTRACT

A bicycle hub includes a hub axle, a hub body, an electric power generator, a freewheel and an electric unit. The hub body is rotatable around the hub axle. The electric power generator is disposed between the hub axle and the hub body. The electric power generator is configured to generate electric power by a relative rotation of the hub axle and the hub body. The freewheel is configured to support a sprocket. The freewheel is connected to the hub body and is rotatable around the hub axle. The electric component is disposed between the hub axle and the freewheel in a radial direction with respect to the center axis. The electric unit is electrically connected to the electric power generator.

20 Claims, 5 Drawing Sheets

(56) References Cited

U.S. PATENT DOCUMENTS

| | | | | |
|---|---|---|---|---|
| 7,785,156 | B1* | 8/2010 | Liao | B62J 6/12 |
| | | | | 439/736 |
| 8,449,157 | B2* | 5/2013 | Guzik | B62J 6/00 |
| | | | | 280/279 |
| 8,936,144 | B2* | 1/2015 | Spahr | B60B 27/023 |
| | | | | 192/46 |
| 9,013,080 | B2* | 4/2015 | Tauchi | H02K 7/108 |
| | | | | 310/750 |
| 9,016,802 | B2* | 4/2015 | Kitamura | B60B 27/0068 |
| | | | | 301/110.5 |
| 9,063,024 | B2* | 6/2015 | Kitamura | G01L 3/105 |
| 9,284,998 | B2* | 3/2016 | Giessibl | F16D 41/24 |
| 9,315,071 | B2* | 4/2016 | Webber | B60B 1/041 |
| 2003/0234587 | A1* | 12/2003 | Sjoberg | B62J 6/12 |
| | | | | 310/67 R |
| 2016/0137259 | A1 | 5/2016 | Zhao et al. | |

FOREIGN PATENT DOCUMENTS

| | | |
|---|---|---|
| JP | 2000-152583 A | 5/2000 |
| JP | 2004-082847 A | 3/2004 |
| JP | WO2002076813 A1 | 7/2004 |

* cited by examiner

BICYCLE HUB

CROSS-REFERENCE TO RELATED APPLICATIONS

This application claims priority to Japanese Patent Application No. 2016-244708, filed on Dec. 16, 2016. The entire disclosure of Japanese Patent Application No. 2016-244708 is hereby incorporated herein by reference.

BACKGROUND

Technical Field

The invention disclosed herein relates to a bicycle hub.

Background Information

A conventional bicycle hub (see Japanese Unexamined Patent Publication No. 2004-82847) includes a hub axle, a hub body, an electric power generator and a freewheel (an example of a rotating body). The hub axle includes a center axis. The hub body is rotatable around the hub axle. The electric power generator is disposed between the hub axle and the hub body in a radial direction. The freewheel is connected to the hub body and is rotatable around the hub axle. In this type of bicycle hub, electric components may be used for controlling electric power of the electric power generator. In this case, the electric components are disposed between the hub axle and the hub body and are electrically connected to the electric power generator.

SUMMARY

In the conventional bicycle hub, there is an issue that the size of the hub body increases, because the electric power generator and the electric components are disposed between the hub axle and the hub body in the radial direction.

The present invention is performed by taking into consideration the above issue. It is an object of the present invention to reduce the size of the hub body.

A bicycle hub according to an aspect of the present invention comprises a hub axle, a hub body, an electric power generator, a rotating body and an electric component. The hub axle includes a center axis. The hub body is rotatable around the hub axle. The electric power generator is disposed between the hub axle and the hub body. The electric power generator is configured to generate electric power by a relative rotation of the hub axle and the hub body. The rotating body is configured to support a sprocket. The rotating body is connected to the hub body and is rotatable around the hub axle. The electric component is disposed between the hub axle and the rotating body in a radial direction with respect to the center axis. The electric component is electrically connected to the electric power generator.

With the bicycle hub, the size of the hub body can be reduced, because the electric component is disposed between the hub axle and the rotating body in the radial direction with respect to the center axis.

A bicycle hub according to an aspect of the present invention comprises a hub axle, a hub body, an electric power generator, a rotating body, and electric component. The hub axle includes a center axis. The hub body is rotatable around the hub axle. The electric power generator is disposed between the hub axle and the hub body. The electric power generator is configured to generate electric power by a relative rotation of the hub axle and the hub body. The rotating body is connected to the hub body and is rotatable around the hub axle. The rotating body is configured to transmit a rotation of a first rotational direction to the hub body, and not to transmit a rotation of a second rotational direction to the hub body. The second rotational direction is opposite to the first rotational direction. The electric component is disposed between the hub axle and the rotating body in a radial direction with respect to the center axis. The electric component is electrically connected to the electric power generator.

With the bicycle hub, the size of the hub body can be reduced, because the electric component is disposed between the hub axle and the rotating body in the radial direction with respect to the center axis.

With the bicycle hub, the size of the hub body can be reduced, even if the rotating body is configured to transmit a rotation of the first rotational direction to the hub body, and not to transmit a rotation of the second rotational direction to the hub body.

In the bicycle hub according to the other aspect of the present invention, the rotating body is configured to transmit a rotation of a first rotational direction to the hub body, and not to transmit a rotation of a second rotational direction to the hub body, the second rotational direction being opposite to the first rotational direction. This configuration can reduce the size of the hub body.

In the bicycle hub according to the other aspect of the present invention, the electric component includes an electronic board. This configuration can reduce the size of the hub body, because it is not necessary to dispose the electronic board in the hub body.

In the bicycle hub according to the other aspect of the present invention, the electric component includes a power storage device that is configured to store the electric power of the electric power generator. This configuration can reduce the size of the hub body, because it is not necessary to dispose the power storage device in the hub body.

In the bicycle hub according to the other aspect of the present invention, the electric component is non-rotatably fixed to the hub axle. This configuration can stably operate the electric component without fixing to the rotating body and by fixing to the hub axle.

The bicycle hub according to the other aspect of the present invention further comprises a first bearing and a first cable. The first bearing rotatably supports the hub body with respect to the hub axle. The first cable passes in the radial direction through an inner side of the first bearing, and electrically connects the electric power generator and the electric component to each other. This configuration can simplify a wiring of the first cable.

The bicycle hub according to the other aspect of the present invention further comprises a second bearing and a first cable. The second bearing rotatably supports the rotating body with respect to the hub axle. The first cable passes in the radial direction through an inner side of the second bearing, and electrically connects the electric power generator and the electric component to each other. This configuration can simplify a wiring of the first cable.

The bicycle hub according to the other aspect of the present invention further comprises a first bearing, a second bearing, and a first cable. The first bearing is rotatably supports the hub body with respect to the hub axle. The second bearing rotatably supports the rotating body with respect to the hub axle. The first cable passes in the radial direction through an inner side on the first and second bearings, and electrically connects the electric power generator and the electric component to each other. This configuration can simplify a wiring of the first cable.

In the bicycle hub according to the other aspect of the present invention, the second bearing is disposed in the radial direction on an inner side of the first bearing. This configuration can reduce the size of the hub body.

In the bicycle hub according to the other aspect of the present invention, the electric component includes a first electrical connector. The first electrical connector is electrically connected to the electric power generator via the first cable. This configuration can easily connect the first cable to the electric component.

In the bicycle hub according to the other aspect of the present invention, the electric component includes a second electrical connector. The second electrical connector electrically connected to an external device via the second cable. This configuration can easily connect the first cable to the electric component.

The bicycle hub according to the other aspect of the present invention further comprises a third bearing. The third bearing rotatably supports the rotating body with respect to the hub axle. The second electrical connector is electrically connected to the external device via the second cable. The second cable passes in the radial direction through an inner side of the third bearing. This configuration can simplify a wiring of the second cable.

In the bicycle hub according to the other aspect of the present invention, the hub body and the rotating body are arranged side by side in an axial direction parallel to the center axis. The second cable extends from inside of the rotating body to outside of the rotating body in a direction away from the hub body.

This configuration can simplify a wiring of the second cable. Also, in case that the external device is disposed on the rotating body side, this configuration can connects the second cable to the external device easily and effectively, as compared with the conventional configuration in which the second cable is pulled out from the inside of the hub body to the outside of the hub body.

The bicycle hub according to the other aspect of the present invention further comprises a rotation detection sensor. The rotation detection sensor is configured to detect a rotation of the rotating body. The rotation detection sensor includes a detected part and a detection sensor. The detected part is provided on one of the electric component and the rotating body. The detection sensor provided on the other of the electric component and the rotating body. This configuration enables the number of rotation, for example, cadence to be measured.

In the bicycle hub according to the other aspect of the present invention, the detected part is a magnet. The detection sensor is configured to detect a magnetic force of the magnet. In this case, the number of rotation, for example, cadence can be measured by the magnetic force.

In the bicycle hub according to the other aspect of the present invention, the electric power generator includes a stator and a magnet. The stator is configured to integrally rotate with the hub axle. The magnet is configured to integrally rotate with the hub body. Herewith, the electric power can be generated in the electric power generator with a simple configuration.

In the bicycle hub according to the other aspect of the present invention, the rotating body is configured to support a plurality of sprockets. This configuration can reduce the size of the hub body, even if the rotating body supports the plurality of sprockets.

In the bicycle hub according to the other aspect of the present invention, the hub body and the rotating body are arranged side by side in an axial direction parallel to the center axis. The rotating body includes a large diameter portion and a small diameter portion. The large diameter portion is positioned closer to the hub body than the small diameter portion. The size of the hub body can be further reduced by providing the small diameter portion.

In the bicycle hub according to the other aspect of the present invention, at least part of the electric component is disposed between the large diameter portion and the hub axle in the radial direction. In this case, the size of the hub body can be further reduced by the small diameter portion in a state where the electric component is substantially disposed in the large diameter portion.

A bicycle hub according to an aspect of the present invention comprises a hub axle, a hub body, an electric power generator, and electric component. The hub axle includes a center axis. The hub body is rotatable around the hub axle. The electric power generator is disposed between the hub axle and the hub body. The electric power generator is configured to generate electric power by a relative rotation of the hub axle and the hub body. The electric component is disposed on an outer side of the hub body in an axial direction parallel to the center axis. The electric component is electrically connected to the electric power generator which is disposed between the hub axle and the hub body. The electric component includes a power storage device. The power storage device is configured to store the electric power of the electric power generator.

With the bicycle hub, the size of the hub body can be reduced, because the electric component is disposed on an outer side of the hub body in the axial direction parallel to the center axis.

According to the invention, the size of the hub body can be reduced with the bicycle hub.

BRIEF DESCRIPTION OF THE DRAWINGS

Referring now to the attached drawings which form a part of this original disclosure.

DETAILED DESCRIPTION OF PREFERRED EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
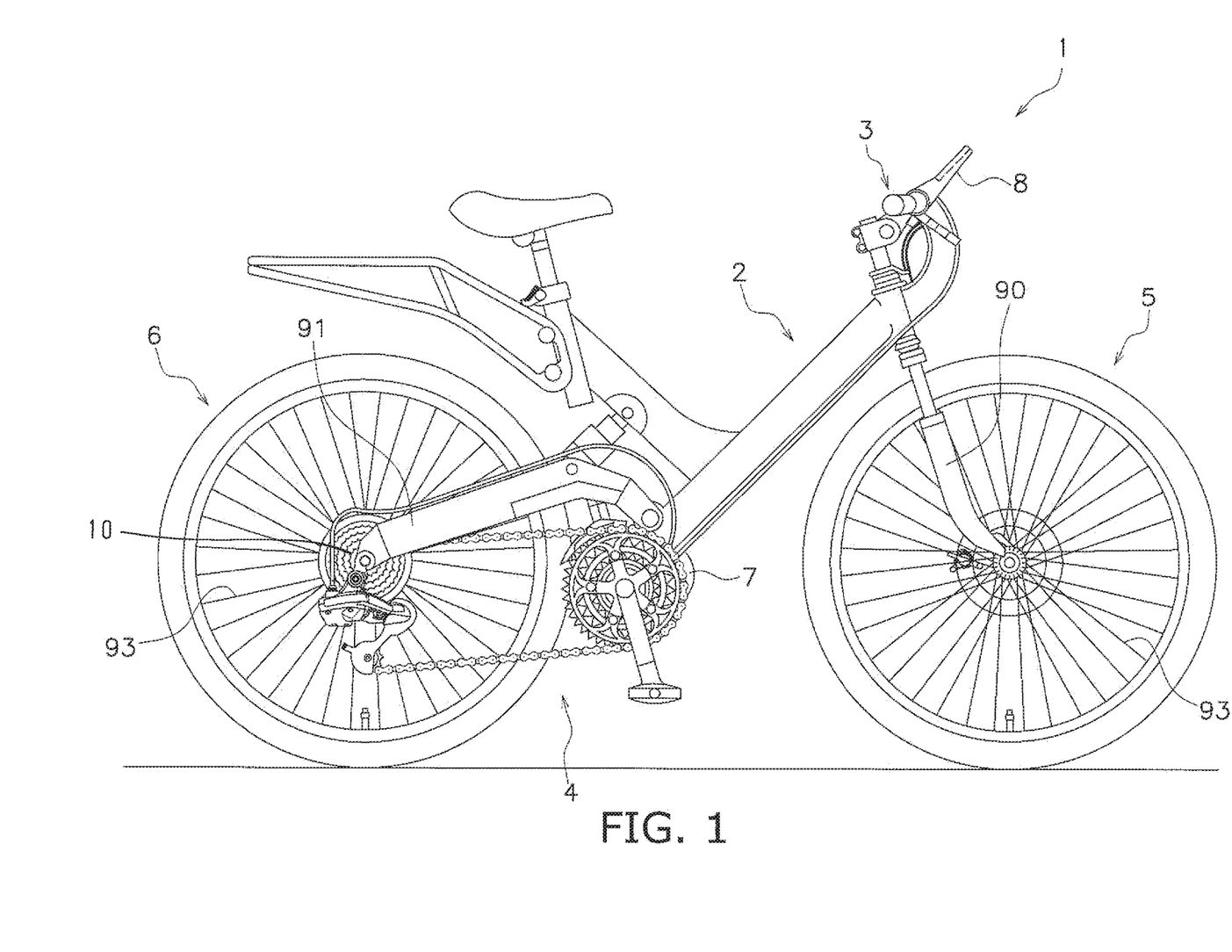
FIG. 1 is a side elevational view of a bicycle having a bicycle hub dynamo according to a first illustrative embodiment.

As shown in FIG. 1, a bicycle according to an embodiment of the present invention comprises a frame 2, a handlebar 3, a drive unit 4, a front wheel 5, a rear wheel 6 and a pair of control devices 7 and 8. A bicycle hub dynamo 10 is provided on the rear wheel 6 (see FIG. 2).

The frame 2 has front and rear suspensions which include a front suspension fork 90 and a rear swing arm 91. The handlebar 3 is fixed to the front suspension fork 90. The drive unit 4 includes a chain, a crank, a plurality of front sprockets, a plurality of rear sprockets, a front derailleur, a rear derailleur and the like. The front and rear wheels 5 and 6 are mounted to the front suspension fork 90 and the rear swing arm 91, respectively. Each of the front and rear wheels 5 and 6 includes a plurality of spokes 93.

The control devices 7 and 8 controls the front and rear derailleurs and the front and rear suspensions. The control device 7 is provided in the vicinity of a hanger portion under a central portion of the frame 2. The control device 8 includes a display portion (not shown), and is mounted to the handlebar 3.

Figure 2:
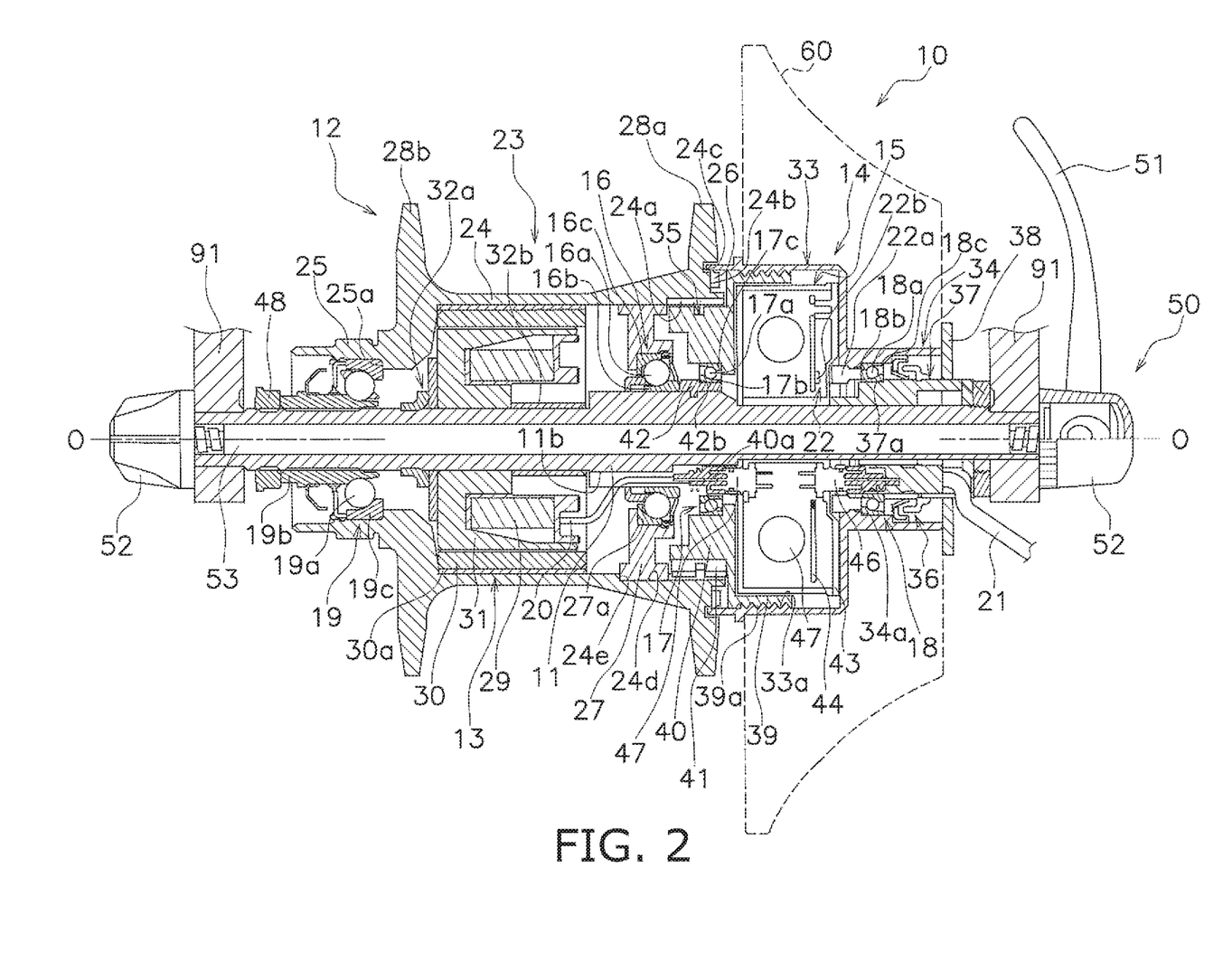
FIG. 2 is a cross-sectional view of the bicycle hub dynamo according to the first illustrative embodiment.

As shown in FIG. 2, the hub dynamo 10 according to the first embodiment is provided on the rear wheel 6 of the bicycle 1. Electric power of the hub dynamo 10 is supplied to the control devices 7 and 8, the derailleurs, the suspensions, and the like. The electric power of the hub dynamo 10 can be supplied to the derailleurs, the suspensions, and the like, through the control devices 7 and 8. The electric power of the hub dynamo 10 can be supplied to the derailleurs, the suspensions, and the like, not through the control devices 7 and 8.

Figure 3:
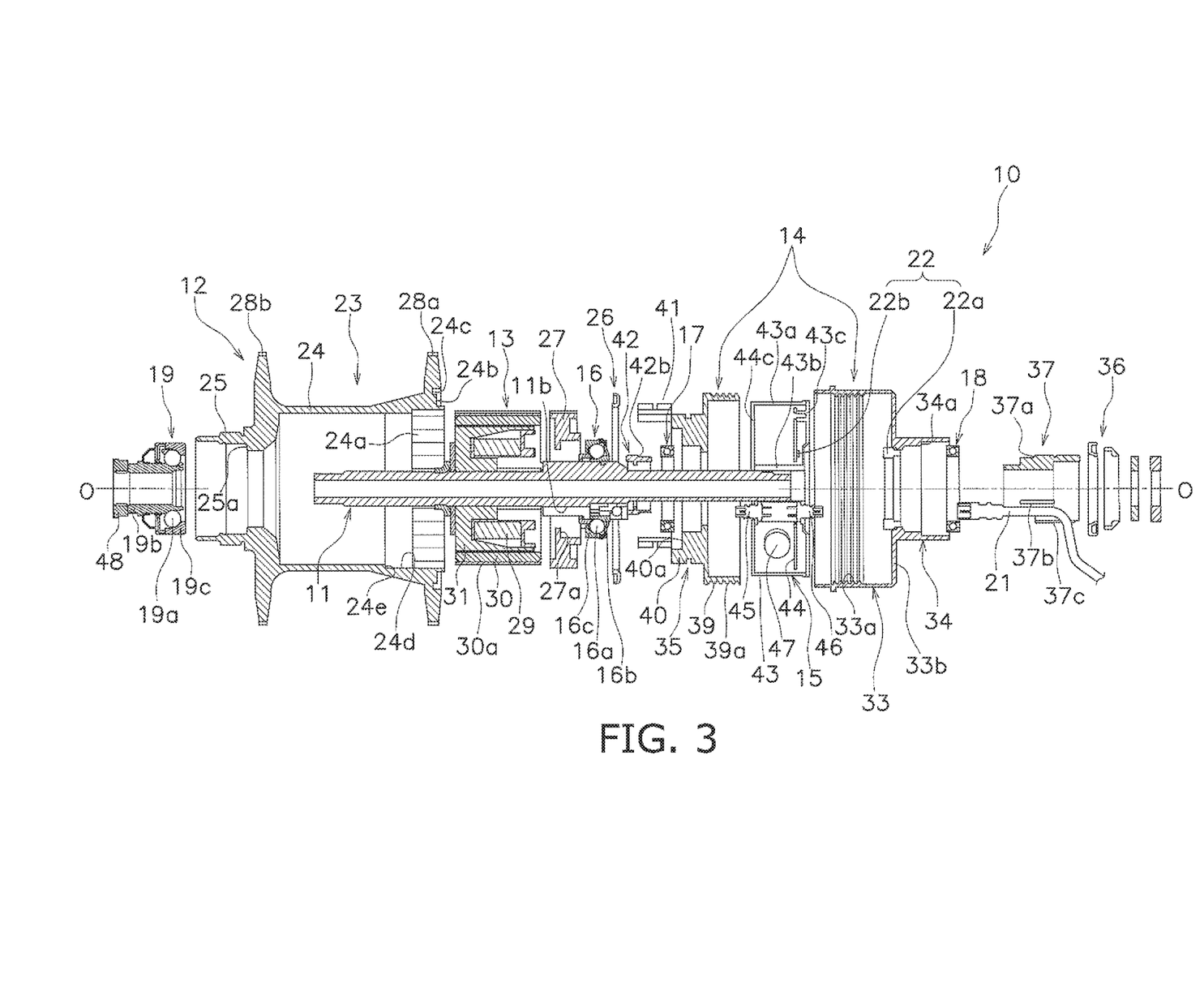
FIG. 3 is an exploded view of the bicycle hub dynamo illustrated in FIG. 2 according to the first illustrative embodiment.

As shown in FIGS. 2 and 3, the hub dynamo 10 is mounted to the frame 2. The hub dynamo 10 comprises a hub axle 11, a hub body 12, an electric power generator 13, a freewheel 14 (an example of a rotating body) and an electric unit 15 (an example of electric component). The hub dynamo 10 further comprises a first bearing 16, a second bearing 17, a third bearing 18, a fourth bearing 19, a first cable 20 and a second cable 21. The hub dynamo 10 further comprises a rotation detection sensor 22.

The hub axle 11 is formed in a substantially tubular shape. The hub axle 11 includes a center axis O. The hub axle 11 is attached to the frame 2. Specifically, the hub axle 11 is mounted to the swing arm 91. More specifically, the hub axle 11 is mounted to a rear end of the frame 2, for example, a tip portion of the swing arm 91.

A quick release mechanism 50 includes a lever 51, a nut 52 and a connecting axle 53. The connecting axle 53 of the quick release mechanism 50 passes through an inner peripheral portion of the hub axle 11. The lever 51 and the nut 52 are screwed to both end portions of the connecting axle 53, respectively. In this state, the hub axle 11 is mounted to the swing arm 91 by operating the lever 51.

As shown in FIG. 2, the hub body 12 is configured to rotate around the hub axle 11. The hub body 12 includes a center axis. The center axis of the hub body 12 is disposed concentrically with the center axis O of the hub axle 11.

The hub body 12 is arranged side by side with the freewheel 14 in an axial direction parallel to the center axis O. The hub body 12 includes a first main body 23 and a pair of flange portions 28a and 28b.

The axial direction includes the axial direction parallel to the center axis O (a rotational axis) and an axial direction along the center axis O. A circumferential direction is a circumferential direction of a circle with the center axis O. A radial direction is a radial direction away from the center axis O as a center of the circle.

As shown in FIGS. 2 and 3, the first main body 23 is formed in a substantially tubular shape. The hub axle 11 is disposed in the inner peripheral portion of the first main body 23. The first main body 23 is disposed spaced from the hub axle 11 at a predetermined interval with respect to the radial direction. The first main body 23 is rotatably supported with respect to the hub axle 11 via the first bearing 16 and the fourth bearing 19.

The first main body 23 includes a first tubular portion 24 and a first boss portion 25. The first tubular portion 24 is formed in a substantially tubular shape. The first tubular portion 24 includes a plurality of ratchet teeth 24a, a first annular recess portion 24b and a second annular recess portion 24c. The ratchet teeth 24a are formed in the circumferential direction on an inner peripheral surface of the first tubular portion 24.

The first annular recess portion 24b is formed in an annular shape on an end portion of the first tubular portion 24 and opens in the axial direction. An annular seal member 26 is disposed in the first annular recess portion 24b. The second annular recess portion 24c is formed on a bottom portion of the first annular recess portion 24b. An end portion of the freewheel 14 is disposed in the second annular recess portion 24c.

The first bearing 16 is disposed in an inner peripheral portion of the first tubular portion 24. The first tubular portion 24 is rotatably supported by the hub axle 11 via the first bearing 16. In this embodiment, a first retaining member 27 is mounted to the first tubular portion 24 to retain an outer ring of the first bearing 16 to the first tubular portion 24.

The first retaining member 27 is formed in a substantially tubular shape. The first retaining member 27 is disposed on an inner peripheral side of the first main body 23. The first retaining member 27 is mounted to an inner peripheral surface of the first tubular portion 24 by an engagement part, for example, a spline engagement. Herewith, the first retaining member 27 becomes integrally rotatable with the first tubular portion 24 and becomes relatively rotatable with respect to the hub axle 11 via the first bearing 16. Also, the first retaining member 27 is positioned by a wall portion 24e in the axial direction. The wall portion 24e is formed on an end portion of a spline groove 24d of the first tubular portion 24.

The first boss portion 25 is formed in a substantially tubular shape. The first boss portion 25 is formed with a smaller diameter than the first tubular portion 24. The first boss portion 25 is integrally formed with the first tubular portion 24. The first boss portion 25 protrudes in the axial direction from the end portion of the first tubular portion 24. The fourth bearing 19 is disposed in an inner peripheral portion of the first boss portion 25.

As shown in FIGS. 2 and 3, the spokes 93 (see FIG. 1) of the rear wheel 6 are attached to the flange portions 28a and 28b. The flange portions 28a and 28b are provided on opposite ends of the first main body 23. Specifically, each of the flange portions 28a and 28b is formed in an annular shape. The flange portion 28a protrudes from an outer peripheral portion of the first main body 23 to an outside in the radial direction. In other words, the flange portion 28a and the flange portion 28b are spaced apart at an interval with each other in the axial direction. The flange portion 28a and the flange portion 28b protrude from both end portions of the first main body 23 to the outside in the radial direction, respectively.

The electric power generator 13 is configured to generate electric power by a relative rotation of the hub axle 11 and the hub body 12. As shown in FIG. 2, the electric power generator 13 is disposed between the hub axle 11 and the hub body 12. Specifically, the electric power generator 13 is disposed between the hub axle 11 and the hub body 12 in the radial direction. More specifically, the electric power generator 13 is disposed between the hub axle 11 and the first main body 23 (the first tubular portion 24) of the hub body 12 in the radial direction.

The electric power generator 13 is connected to the electric unit 15 via the first cable 20. As shown in FIGS. 2 and 3, the electric power generator 13 includes a stator coil 29 (an example of a stator) and a magnet 30 for power generation. The stator coil 29 is configured to integrally rotate with the hub axle 11.

Specifically, the stator coil 29 is fixed to the hub axle 11 via a stator yoke 31. The stator yoke 31 is fixed to the hub axle 11 so as to integrally rotate with the hub axle 11. The stator yoke 31 is axially positioned in the axial direction by a pair of fixing members 32a and 32b. The fixing members 32a and 32b are mounted to the hub axle 11 on opposite sides of the stator yoke 31 in the axial direction. The first cable 20 is electrically connected to the electric unit 15 and the stator coil 29 to supply current from the stator coil 29 to the electric unit 15.

The magnet 30 is configured to integrally rotate with the hub body 12 for power generation. Specifically, the magnet 30 is a magnet in which N-pole and S-pole are arranged alternately in the circumferential direction. The magnet 30 is formed in a substantially annular shape. The magnet 30 is disposed on an outer peripheral portion of the stator coil 29 via a fixing member 30a. The magnet 30 is fixed to the hub body 12 by a fixing arrangement, for example, a press-fit, so as to integrally rotate with the first main body 23 of the hub body 12 (the first tubular portion 24).

Herewith, when the hub body 12 rotates with respect to the hub axle 11, the magnet 30, which is fixed to the hub body 12, rotates with respect to the stator coil 29 fixed to the hub axle 11 for power generation. Then, an induced electromotive force generates on the stator coil 29 and a current flow. The current is supplied to the electric unit 15 via the first cable 20.

As shown in FIG. 2, the freewheel 14 is arranged side by side with the hub body 12 in the axial direction parallel to the center axis O. The freewheel 14 is connected to the hub body 12, and is configured to rotate around the hub axle 11. The freewheel 14 includes a center axis. The center axis of the freewheel 14 is disposed concentrically with the center axis O of the hub axle 11.

The freewheel 14 is configured to support at least one rear sprocket 60. In this embodiment, the freewheel 14 is configured to support a plurality of the rear sprockets 60.

The freewheel 14 is configured to transmit a rotation of a first rotational direction to the hub body 12, and not to transmit a rotation of a second rotational direction to the hub body 12. The second rotational direction is opposite to the first rotational direction. The first rotational direction is a rotational direction in which the rear sprockets 60 rotate in case that a driving force is transmitted from the chain to the rear sprockets 60.

The freewheel 14 is formed in a substantially tubular shape. The hub axle 11 is disposed in the inner peripheral portion of the freewheel 14. The freewheel 14 is disposed at an interval with the hub axle 11 in the radial direction. The freewheel 14 is connected to the first main body 23 (the first tubular portion 24) of the hub body 12.

The freewheel 14 includes a second tubular portion 33 (an example of a large diameter portion), the second boss portion 34 (an example of a small diameter portion) and a connecting portion 35.

As shown in FIGS. 2 and 3, the second tubular portion 33 is formed in a substantially tubular shape. The second tubular portion 33 is disposed side by side with the hub body 12 in the axial direction. The second tubular portion 33 is on the hub body 12 adjacent the flange portion 28a of the hub body 12. The second tubular portion 33 is positioned closer to the hub body 12 than the second boss portion 34 in the axial direction. In other words, the second tubular portion 33 is disposed between the hub body 12 and the second boss portion 34 in the axial direction.

The electric unit 15 is disposed in the tubular portion 34. An opening end portion of the second tubular portion 33 is disposed in the second annular recess portion 24c of the hub body 12. The annular seal member 26 is disposed between an inner peripheral surface of an opening end portion of the second tubular portion 33 and an inner peripheral surface of the first annular recess portion 24b in the radial direction. The annular seal member 26 prevents foreign matter from intruding into the hub body 12.

The connecting portion 35 is mounted to the second tubular portion 33 so as to integrally rotate with the second tubular portion 33. Specifically, the second tubular portion 33 includes a female screw portion 33a. The female screw portion 33a is formed in the circumferential direction on an inner peripheral surface of the second tubular portion 33. A male screw portion 39a (describe below) of the connecting portion 35 is screwed to the female screw portion 33a. Herewith, a third tubular portion 39 (described below) of the connecting portion 35 is fixed to the second tubular portion 33.

The rear sprockets 60 are disposed on an outer peripheral surface of the second tubular portion 33 (see FIG. 2). Specifically, the rear sprockets 60 are mounted to the outer peripheral surface of the second tubular portion 33 by a fixing arrangement, for example, a spline engagement, so as to integrally rotate with the second tubular portion 33.

The second boss portion 34 is formed in a substantially tubular shape. The second boss portion 34 is formed with a smaller diameter than the second tubular portion 33. The second boss portion 34 is integrally formed with the second tubular portion 33.

The second boss portion 34 protrudes in the axial direction from a wall portion on the side opposite to an opening of the second tubular portion 33. Specifically, the second boss portion 34 protrudes in the axial direction from an annular wall portion 33b, which extends from an end portion of the second tubular portion 33 to the inside in the radial direction. A seal member 36 is disposed in an inner peripheral portion of the second boss portion 34. The seal member 36 prevents foreign matter from intruding into the second boss portion 34.

The third bearing 18 is disposed in an inner peripheral portion of the second boss portion 34. The second boss portion 34 is rotatably supported by the hub axle 11 via the third bearing 18. In this embodiment, a second retaining member 37 is mounted to the hub axle 11 to retain an inner ring of the third bearing 18 on the hub axle 11.

The second retaining member 37 is formed in a substantially tubular shape. The second retaining member 37 is disposed on an inner peripheral side of the freewheel 14, for example, an inner peripheral side of the second boss portion 34. The second retaining member 37 is mounted to an outer peripheral surface of the hub axle 11 by a fixing arrangement, for example, a spline engagement. Herewith, the second retaining member 37 integrally rotates with the hub axle 11 and relatively rotates with respect to the second boss portion 34 via the third bearing 18. The second retaining member 37 is positioned in the axial direction by a housing 43 (described below) of the electric unit 15.

The rear sprockets 60 (see FIG. 2) are disposed on an outer peripheral surface of the second boss portion 34. Specifically, the plurality of rear sprockets 60 are mounted to the outer peripheral surface of the second boss portion 34 by a fixing arrangement, for example, a spline engagement, so as to integrally rotate with the second boss portion 34. The rear sprockets 60 are mounted to the outer peripheral surfaces of the second tubular portion 33 and the second boss portion 34. The rear sprockets 60 are positioned in the axial direction by a fixing part, for example, a lock nut 38 (see FIG. 2), in the axial direction. The lock nut 38 is screwed on the hub axle 11.

As shown in FIGS. 2 and 3, the connecting portion 35 is formed in a substantially tubular shape. The connecting portion 35 is mounted to the second tubular portion 33 so as to integrally rotate with the second tubular portion 33. The connecting portion 35 includes the third tubular portion 39 and a third boss portion 40.

The third tubular portion 39 is mounted to the second tubular portion 33 of the freewheel 14. Specifically, the third tubular portion 39 includes the male screw portion 39*a*. The male screw portion 39*a* is formed in the circumferential direction on an outer peripheral surface of the third tubular portion 39. The male screw portion 39*a* is screwed into the female screw portion 33*a* of the second tubular portion 33. Herewith, the third tubular portion 39 is fixed with the second tubular portion 33 so as to integrally rotate with the second tubular portion 33.

The third boss portion 40 is formed with the third tubular portion 39. The third boss portion 40 protrudes from an end portion of the third tubular portion 39 in the axial direction. The third boss portion 40 is formed with a smaller diameter than the second tubular portion 33.

The third boss portion 40 is disposed in an inner peripheral portion of the hub body 12. Specifically, the third boss portion 40 is disposed in the inner peripheral portion of the first main body 23 (the first tubular portion 24) of the hub body 12.

The third boss portion 40 is disposed in the inner peripheral portion of the first tubular portion 24 of the hub body 12. Specifically, the third boss portion 40 is disposed in the inner peripheral portion of the first tubular portion 24 of the hub body 12, such that an outer peripheral surface of the third boss portion 40 faces the inner peripheral surface of the first tubular portion 24 in the radial direction.

A ratchet claw 41 is mounted to the outer peripheral surface of the third boss portion 40. In this embodiment, a plurality of ratchet claws 41 are pivotally mounted to the outer peripheral surface of the third boss portion 40. The tip portion of the ratchet claw 41 engages with the ratchet teeth 24*a* that are formed on the inner peripheral portion of the first tubular portion 24. Thus, a ratchet mechanism is configured by the ratchet claws 41 and the ratchet teeth 24*a*. The freewheel 14 transmits a rotation of the first rotational direction to the hub body 12, and does not transmit a rotation of the second rotational direction to the hub body 12 by the ratchet mechanism, that is, a one-way clutch.

The second bearing 17 is disposed in an inner peripheral portion of the third boss portion 40. The third boss portion 40 is rotatably supported by the hub axle 11 via the second bearing 17.

In this embodiment, a third retaining member 42 is mounted to the hub axle 11 to retain an inner ring of the second bearing 17 on the hub axle 11. The third retaining member 42 is formed in a substantially C-shape. The third retaining member 42 is disposed on an inner peripheral side of the freewheel 14. For example, the third retaining member 42 is an inner peripheral side of the connecting portion 35. The third retaining member 42 is mounted to the hub axle 11 so as to integrally rotate with the hub axle 11.

An annular protrusion is provided on an inner peripheral surface of the third retaining member 42. The annular protrusion engages with an annular recess portion provided on an outer peripheral surface of the hub axle 11. In this state, the third retaining member 42 positions the first bearing 16 in the axial direction by abutting against the inner ring of the first bearing 16.

The third retaining member 42 is mounted to an outer peripheral surface of the hub axle 11 by a fixing arrangement, for example, the engagement of the annular protrusion and the annular recess portion. Herewith, the third retaining member 42 integrally rotates with the hub axle 11 and relatively rotates with respect to the connecting portion 35 via the second bearing 17.

The electric unit 15 is electrically connected to the electric power generator 13. Also, the electric unit 15 is electrically connected to an external device 61. The external device 61 includes the control devices 7 and 8, the derailleurs, the suspensions, and the like. The external device 61 can include a bicycle light and the like.

As shown in FIGS. 2 and 3, the electric unit 15 is non-rotatably fixed to the hub axle 11. The electric unit 15 is disposed between the hub axle 11 and the freewheel 14 in the radial direction with respect to the center axis O. Specifically, the at least part of the electric unit 15 is disposed between the second tubular portion 33 and the hub axle 11 in the radial direction. The electric unit 15 is disposed on an outer side of the hub body 12 in the axial direction parallel to the center axis O.

The electric unit 15 includes the housing 43, an electronic board 44 (e.g., a printed circuit board with an electronic component in the illustrated embodiment), a first electrical connector 45, a second electrical connector 46 and a power storage device 47.

As shown in FIG. 2, the housing 43 is disposed in a space formed between the second tubular portion 33 of the freewheel 14 and the hub axle 11 in the radial direction. As shown in FIG. 3, the housing 43 includes an outer tubular portion 43*a*, an inner tubular portion 43*b* and a pair of wall portions 44*c*. The outer tubular portion 43*a* is formed in a substantially tubular shape. The outer tubular portion 43*a* is disposed radially outwardly from the inner tubular portion 43*b*. The outer tubular portion 43*a* is disposed at an interval with the second tubular portion 33 in the radial direction. Specifically, the outer tubular portion 43*a* is disposed radially inward at an interval with respect to the second tubular portion 33 and the third tubular portion 39.

The inner tubular portion 43*b* is formed in a substantially tubular shape. The inner tubular portion 43*b* is disposed radially inward from the outer tubular portion 43*a*. An inner peripheral surface of the inner tubular portion 43*b* is mounted to the outer peripheral surface of the hub axle 11 by a fixing arrangement, for example, a spline engagement. Herewith, the inner tubular portion 43*b* becomes integrally rotatable with the hub axle 11.

Each of the pair of wall portions 44*c* is a portion which covers openings of the outer tubular portion 43*a* and the inner tubular portion 43*b*. Each of the pair of wall portions 44*c* is formed in a substantially annular shape. Each of the pair of wall portions 44*c* is disposed in the axial direction at an interval with each other. An inner space of the housing 43 is formed by the wall portions 44*c*, the outer tubular portion 43*a* and the inner tubular portion 43*b*. In other words, the inner space of the housing 43 is formed by the outer tubular portion 43a, the inner tubular portion 43b and the wall portions 44c.

The electronic board 44 includes at least one processor programmed to perform various controls on the hub dynamo 10. For example, the at least one processor of the electronic board 44 performs electric power control of the electric power generator 13, power storage control of the power storage device 47, signal control of the rotation detection sensor 22, and the like. The at least one processor of the electronic board 44 can perform shift control of the derailleurs. In this case, the electronic board 44 can send signals for changing gears to each of the derailleurs, based on a signal of the rotation detection sensor 22. Also, the electronic board 44 can includes a slant sensor for detecting a slant of the bicycle 1. For example, in case that the slant sensor is an acceleration sensor which detects gravitational acceleration, the slant of the bicycle 1 is detected by the acceleration sensor. As shown in FIGS. 2 and 3, the electronic board 44 is mounted to the housing 43. In this embodiment, the electronic board 44 is mounted to a wall portion of the housing 43.

The first electrical connector 45 is used for electrically connecting the electric power generator 13 and the electronic board 44 with each other. As shown in FIGS. 2 and 3, the first electrical connector 45 is mounted to the housing 43. In this embodiment, the first electrical connector 45 is mounted to a wall portion on the side of the electric power generator 13. Specifically, the first electrical connector 45 engages with a hole portion provided on the wall of on the side of the electric power generator 13.

The first electrical connector 45 is electrically connected to the electric power generator 13 via the first cable 20. Specifically, the first electrical connector 45 is electrically connected to the electric power generator 13 via the first cable 20 which passes in the radial direction through the inner side of the second bearing 17. Also, the first electrical connector 45 is electrically connected to the electronic board 44 via a first connecting line (not shown).

The second electrical connector 46 is used for electrically connecting the external device 61 and the electronic board 44 with each other. As shown in FIGS. 2 and 3, the second electrical connector 46 is mounted to the housing 43. In this embodiment, the second electrical connector 46 is mounted to a wall portion opposite to the electric power generator 13, that is, the wall portion of the end portion side of the hub axle 11. Specifically, the second electrical connector 46 engages with a hole portion that is provided on the wall portion of the end portion side of the hub axle 11.

The second electrical connector 46 is electrically connected to the external device 61 via the second cable 21. Specifically, the second electrical connector 46 is electrically connected to the external device 61 via the second cable 21 which passes in the radial direction through the inner side of the third bearing 18. Also, the second electrical connector 46 is electrically connected to the electronic board 44 via a second connecting line (not shown).

The power storage device 47 is configured to store the electric power of the electric power generator 13. The power storage device 47 is configured to allow the electric unit 15 to operate. The power storage device 47 is configured to supply the electric power to the external device 61.

For example, the power storage device 47 is a condenser. As shown in FIGS. 2 and 3, the power storage device 47 is attached to the electronic board 44. In this embodiment, a plurality of the power storage devices 47 are disposed at intervals with each other in the circumferential direction. The power storage devices 47 are attached to the electronic board 44.

The first bearing 16 rotatably supports the hub body 12 with respect to the hub axle 11. As shown in FIGS. 2 and 3, the first bearing 16 includes a plurality of rolling elements 16a, an inner ring 16b and an outer ring 16c.

The rolling elements 16a of the first bearing 16 are disposed between the inner ring 16b and the outer ring 16c of the first bearing 16. The inner ring 16b of the first bearing 16 is mounted to the hub axle 11 so as to integrally rotate with the hub axle 11. In this embodiment, the inner ring 16b of the first bearing 16 is mounted to an outer peripheral surface of the hub axle 11 by an engagement arrangement, for example, press fit. The inner ring 16b of the first bearing 16 is positioned by the third retaining member 42 in the axial direction.

The outer ring 16c of the first bearing 16 is mounted to the hub body 12 (the first tubular portion 24) so as to integrally rotate with the hub body 12. Specifically, the outer ring 16c of the first bearing 16 is mounted to the first tubular portion 24 via the first retaining member 27. For example, the outer ring 16c of the first bearing 16 is mounted to a step portion 27a of the first retaining member 27, which is mounted to the first tubular portion 24 so as to integrally rotate with the first tubular portion 24, by an engagement arrangement, for example, a press-fit. Herewith, the outer ring 16c of the first bearing 16 is configured to integrally rotate with the hub body 12 via the first retaining member 27. Also, the outer ring 16c of the first bearing 16 is positioned by in the axial direction the step portion 27a of the first retaining member 27.

The second bearing 17 rotatably supports the freewheel 14 with respect to the hub axle 11. As shown in FIGS. 2 and 3, the second bearing 17 includes a plurality of rolling elements 17a, an inner ring 17b and an outer ring 17c.

The rolling elements 17a of the second bearing 17 are disposed between the inner ring 17b and the outer ring 17c of the second bearing 17. The inner ring 17b of the second bearing 17 is mounted to the hub axle 11 so as to integrally rotate with the hub axle 11. Specifically, the inner ring 17b of the second bearing 17 is mounted to the hub axle 11 so as to integrally rotate with the hub axle 11 via the third retaining member 42. For example, the inner ring 17b of the second bearing 17 is mounted to a step portion 42b of the third retaining member 42, which is mounted to the hub axle 11 so as to integrally rotate with the hub axle 11, by an engagement arrangement, for example, press fit. Herewith, the inner ring 17b of the second bearing 17 is configured to integrally rotate with the hub axle 11 via the third retaining member 42. Also, the inner ring 17b of the second bearing 17 is positioned in the axial direction by the step portion 42b of the third retaining member 42.

The outer ring 17c of the second bearing 17 is mounted to the freewheel 14 (the connecting portion 35) so as to integrally rotate with the freewheel 14. Specifically, the outer ring 17c of the second bearing 17 is mounted to the third boss portion 40 of the connecting portion 35 so as to integrally rotate with the third boss portion 40 of the connecting portion 35. For example, the outer ring 17c of the second bearing 17 is mounted to a step portion 40a of the third boss portion 40 by an engagement arrangement, for example, a press-fit. Herewith, the outer ring 17c of the second bearing 17 is configured to integrally rotate with the freewheel 14. Also, the outer ring 17c of the second bearing 17 is positioned in the axial direction by the step portion 40a of the third boss portion 40.

The third bearing 18 rotatably supports the freewheel 14 with respect to the hub axle 11. As shown in FIGS. 2 and 3, the third bearing 18 includes a plurality of rolling elements 18*a*, an inner ring 18*b* and an outer ring 18*c*.

The rolling elements 18*a* of the third bearing 18 are disposed between the inner ring 18*b* and the outer ring 18*c* of the third bearing 18. The inner ring 18*b* of the third bearing 18 is mounted to the hub axle 11 so as to integrally rotate with the hub axle 11. Specifically, the inner ring 18*b* of the third bearing 18 is mounted to the hub axle 11 so as to integrally rotate with the hub axle 11 via the second retaining member 37. For example, the inner ring 18*b* of the third bearing 18 is mounted to a step portion 37*a* of the second retaining member 37, which is mounted to the hub axle 11 so as to integrally rotate with the hub axle 11, by an engagement arrangement, for example, a press-fit. Herewith, the inner ring 18*b* of the third bearing 18 is configured to integrally rotate with the hub axle 11 via the second retaining member 37. Also, the inner ring 18*b* of the third bearing 18 is positioned in the axial direction by the step portion 37*a* of the second retaining member 37.

The outer ring 18*c* of the third bearing 18 is mounted to the freewheel 14 (the second boss portion 34) so as to integrally rotate with the freewheel 14. Specifically, the outer ring 18*c* of the third bearing 18 is mounted to a step portion 34*a* of the second boss portion 34 by an engagement arrangement, for example, a press-fit. Herewith, the outer ring 18*c* of the third bearing 18 is configured to integrally rotate with the freewheel 14. Also, the outer ring 18*c* of the third bearing 18 is positioned in the axial direction by the step portion 34*a* of the second boss portion 34.

The fourth bearing 19 rotatably supports the hub body 12 with respect to the hub axle 11. As shown in FIGS. 2 and 3, the fourth bearing 19 includes a plurality of rolling elements 19*a*, an inner ring 19*b* and an outer ring 19*c*.

The rolling elements 19*a* of the fourth bearing 19 are disposed between the inner ring 19*b* and the outer ring 19*c* of the fourth bearing 19. The inner ring 19*b* of the fourth bearing 19 is mounted to the hub axle 11 so as to integrally rotate with the hub axle 11. In this embodiment, the inner ring 19*b* of the fourth bearing 19 is mounted to an outer peripheral surface of the hub axle 11 by an engagement arrangement, for example, a spline engagement. The inner ring 19*b* of the fourth bearing 19 is positioned in the axial direction by a fixing part, for example, a lock nut 48. The lock nut 48 is screwed on the hub axle 11.

The outer ring 19*c* of the fourth bearing 19 is mounted to the hub body 12 (the first boss portion 25) so as to integrally rotate with the hub body 12. Specifically, the outer ring 19*c* of the fourth bearing 19 is mounted to a step portion 25*a* of the first boss portion 25 by an engagement arrangement, for example, a press-fit, so as to integrally rotate with the first boss portion 25. Herewith, the outer ring 19*c* of the fourth bearing 19 is configured to integrally rotate with the hub body 12. Also, the outer ring 19*c* of the fourth bearing 19 is positioned in the axial direction by the step portion 25*a* of the first boss portion 25.

As shown in FIG. 2, the first cable 20 electrically connects the electric power generator 13 and the electric unit 15 to each other. Specifically, the first cable 20 passes in the radial direction through an inner side of the first bearing 16, and electrically connects the electric power generator 13 and the electric unit 15 to each other. More specifically, the first cable 20 passes in the radial direction through an inner side of the first bearing 16 and the second bearing 17, and electrically connects the electric power generator 13 and the electric unit 15 to each other. The first cable 20 is electrically connected to the electric power generator 13 and to a first electrical connector 45 of the electric unit 15. Herewith, the electric power, which is generated in the electric power generator 13, is supplied to the electric unit 15.

As shown in FIGS. 2 and 3, the first cable 20 is disposed in a groove portion 11*b* of the hub axle 11. The groove portion 11*b* extends on an outer peripheral surface of the hub axle 11 in the axial direction. A radial opening of the groove portion 11*b* is covered by the inner ring 16*b* of the first bearing 16. In other words, the first cable 20 is disposed along the groove portion 11*b*, in a state where the first cable 20 pass through a hole portion which is formed by the groove portion 11*b* and the inner ring 16*b* of the first bearing 16.

The second cable 21 electrically connects the electric unit 15 and the external device 61 to each other. Specifically, as shown in FIG. 2, the second cable 21 passes in the radial direction through an inner side of the third bearing 18, and electrically connects the electric unit 15 and the external device 61 to each other.

The second cable 21 is pulled out from the inside of the freewheel 14 to the outside of the freewheel 14 in a direction away from the hub body 12. Specifically, the second cable 21 is connected to a second electrical connector 46 of the electric unit 15 and passes in the radial direction through an inner side of the third bearing 18. Thus, the second cable 21 extends in a direction away from the electric unit 15, and is pulled out from the inside of the freewheel 14 to the outside of the freewheel 14.

As shown in FIG. 3, the second cable 21 is retained by the second retaining member 37. In this embodiment, the second retaining member 37 includes a first hole portion 37*b* for retaining the second cable 21, and a second hole portion 37*c* for pulling out the second cable 21. The first hole portion 37*b* extends on the third retaining member 42 in the axial direction. The second hole portion 37*c* is formed so as to communicate with the first hole portion 37*b*. The second hole portion 37*c* penetrates in the radial direction through an outer peripheral portion of the second retaining member 37. By this configuration, the second cable 21, which is disposed in the first hole portion 37*b*, is pulled out toward the outside of the second retaining member 37 via the second hole portion 37*c*. Thus, the second cable 21 is pulled out from the inside of the freewheel 14 to the outside of the freewheel 14.

The second cable 21 can be a PLC (Power Line Communication) cable. In this case, the second cable 21 can supply the electric power to the external device 61, and/or can send or receive communication signal. Also, in case that the second cable 21 is connected to the derailleur(s), the second cable 21 can supply the electric power for operating the derailleur(s), and/or can send or receive signal for operating the derailleur(s).

The rotation detection sensor 22 is configured to detect a rotation of the freewheel 14 with respect to the hub axle 11. As shown in FIGS. 2 and 3, the rotation detection sensor 22 includes a detected part 22*a* and a detection sensor 22*b*.

The detected part 22*a* is provided on either one of the electric unit 15 and the freewheel 14. In this embodiment, the detected part 22*a* is mounted to the freewheel 14 which relatively rotates with respect to the hub axle 11.

For example, the detected part 22*a* is at least one magnet. In this embodiment, the detected part 22*a* includes a plurality of magnets. The detected part 22*a*, for example, the magnets are disposed in the circumferential direction at predetermined intervals with each other. The detected part 22*a* is fixed to an inner peripheral portion of the freewheel 14, for example, the inner peripheral portion of the second boss portion 34 of the freewheel 14. In this state, the detected part 22*a* is disposed between the electric unit 15 and the third bearing 18 in the axial direction. Also, the detected part 22*a* is disposed in the radial direction on an outer side of the second electrical connector 46 of the electric unit 15.

The detection sensor 22*b* is configured to detect the detected part 22*a*. The detection sensor 22*b* is provided on the other of the electric unit 15 and the freewheel 14. In this embodiment, the detection sensor 22*b* is mounted to the electric unit 15 which integrally rotates with the hub axle 11.

For example, the detection sensor 22*b* is a sensor which is configured to detect magnetic force of the magnet. The detection sensor 22*b* is fixed to the electric unit 15, for example, the electronic board 44. Herewith, when the detected part 22*a* rotates with the freewheel 14 with respect to the hub axle 11, the detection sensor 22*b*, which is fixed to the electric unit 15 (the electronic board 44), detects the passage of the detected part 22*a* (each of the magnets).

Figure 4:
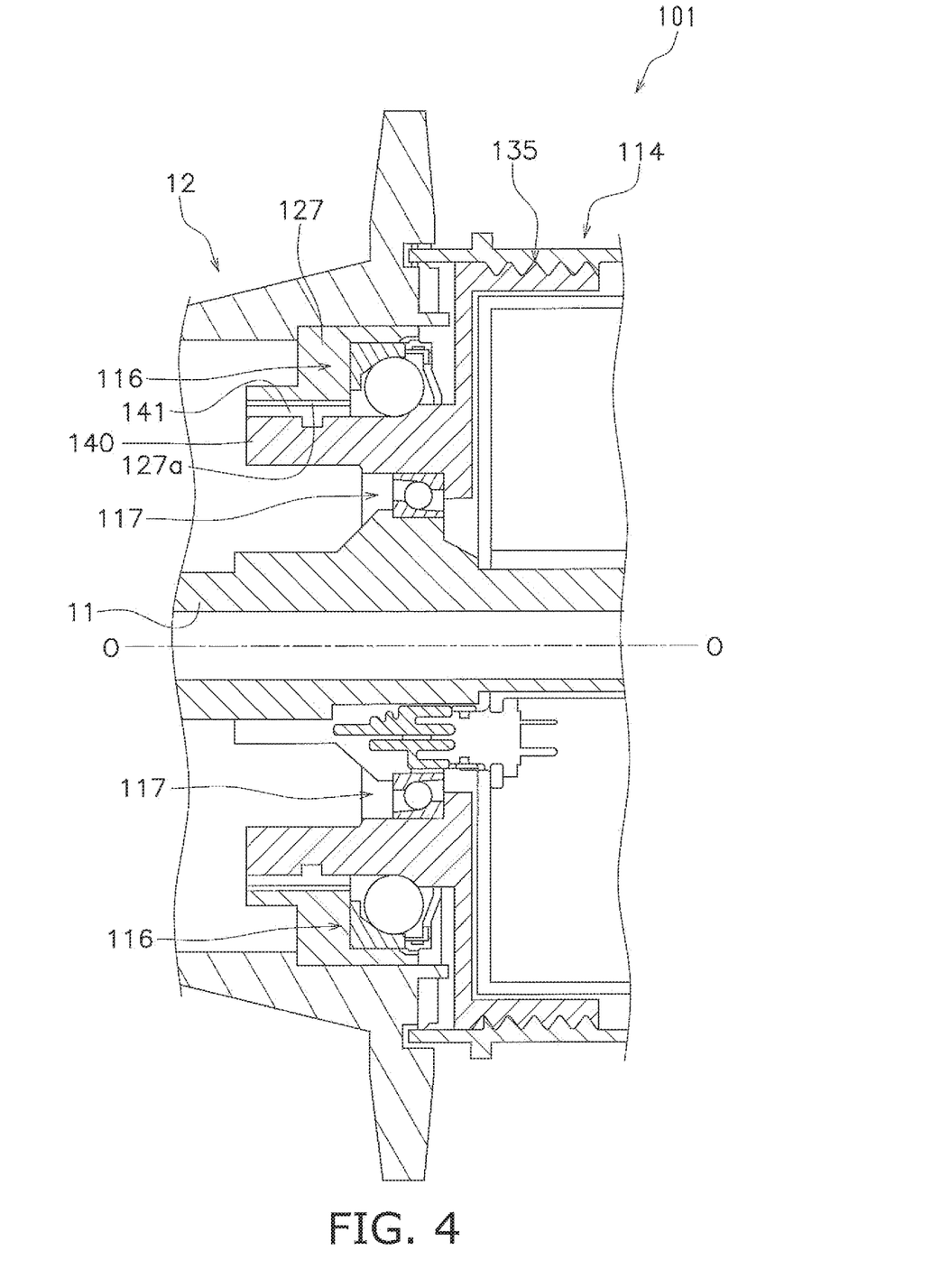
FIG. 4 is a partially enlarged cross-sectional view of a bicycle hub dynamo according to a first variation.

In a dynamo 101 according to a first variation 1, the configuration of a second bearing 117 is different from the configuration of the above embodiment. In the above embodiment, the second bearing 17 is disposed side by side with the first bearing 16 in the axial direction. Instead of this, in the first variation, as shown in FIG. 4, the second bearing 117 is disposed in the radial direction on an inner side of a first bearing 116.

Explanation is omitted about a similar configuration to the above embodiment and the same symbol as the above embodiment is used for the similar configuration. Also, the explanation omitted herein is equivalent to one of the above embodiment.

In this case, the first bearing 116 is disposed between a first retaining member 127 and a connecting portion 135 of a freewheel 114 in the radial direction. Specifically, the first bearing 116 is disposed between the first retaining member 127 and a third boss portion 140 of the connecting portion 135 in the radial direction.

The second bearing 117 is disposed between the connecting portion 135 of the freewheel 114 and the hub axle 11 in the radial direction. Specifically, the second bearing 117 is disposed between the third boss portion 140 of the connecting portion 135 and the hub axle 11 in the radial direction.

In the first variation, ratchet teeth 127*a* are formed on an inner peripheral surface of the first retaining member 127, and ratchet claws 141 are mounted to an outer peripheral surface of the third boss portion 140 of the freewheel 114 (the connecting portion 135). A tip portion of each of the ratchet claws 141 engages with the ratchet teeth 127*a* and a ratchet mechanism, that is, a one-way clutch is configured by the ratchet claws 141 and the ratchet teeth 127*a*.

This configuration enable an advantageous effect to be achieved and the hub body 12 and the freewheel 114 to rotate with respect to the hub axle 11. Also, the freewheel 114 can be configured so as to transmit a rotation of the first rotational direction to the hub body 12, and not to transmit a rotation of the second rotational direction to the hub body 12.

Figure 5:
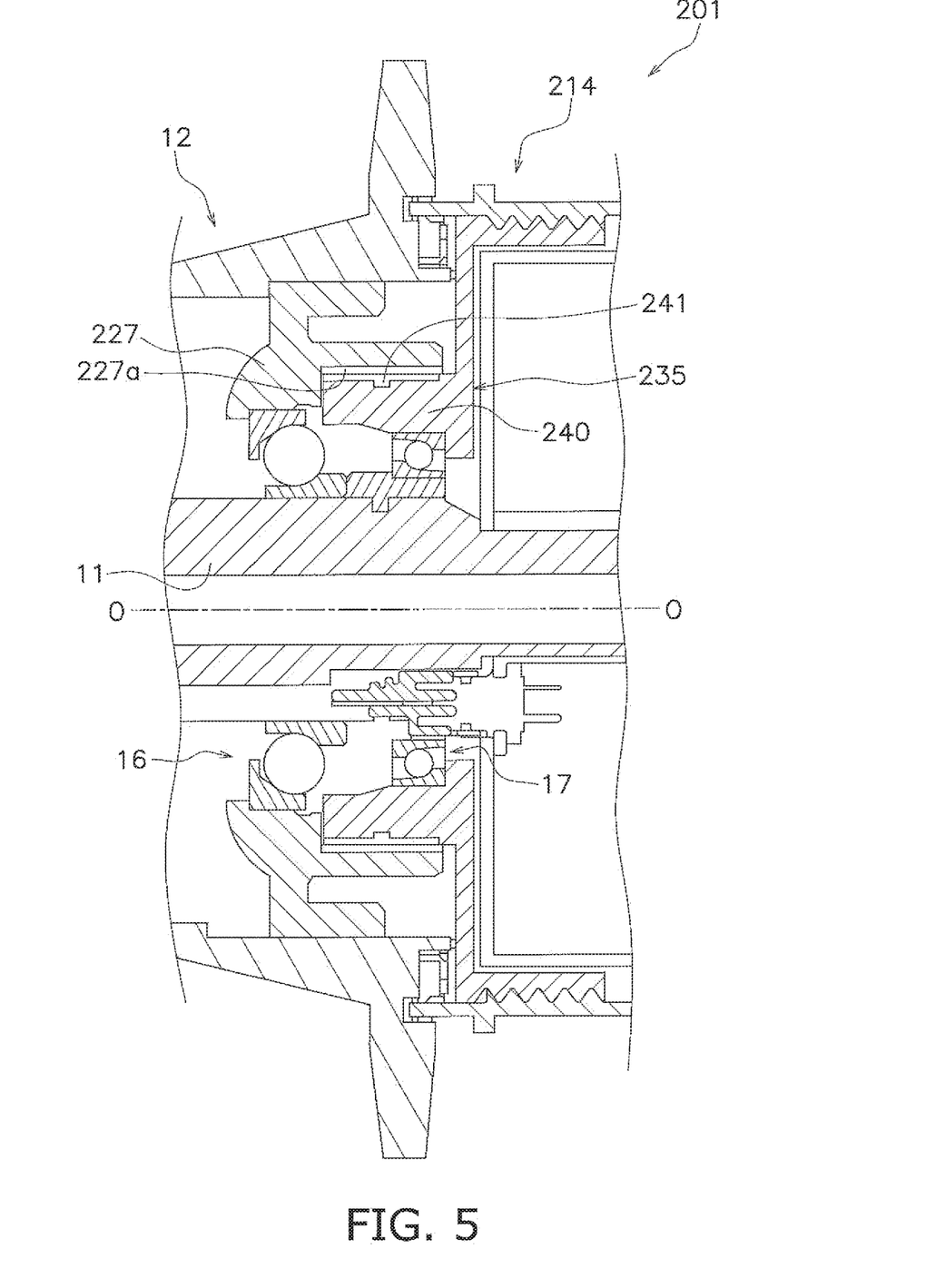
FIG. 5 is a partially enlarged cross-sectional view of a bicycle hub dynamo according to a second variation.

In a dynamo 201 according to a second variation, the configuration of the ratchet mechanism is different from the configuration of the above embodiment. In the above embodiment, the ratchet mechanism is configured by the ratchet teeth 24*a* of the hub body 12 and the ratchet claws 41 mounted to the connecting portion 35 of the freewheel 14. Instead of this, in the second variation, as shown in FIG. 5, the ratchet mechanism is configured by ratchet teeth 227*a* of a first retaining member 227 and ratchet claws 241 mounted to a connecting portion 235 of a freewheel 214.

Explanation is omitted about a similar configuration to the above embodiment and the same symbol as the above embodiment is used for the similar configuration. Also, the explanation omitted herein is equivalent to one of the above embodiment.

In this case, the ratchet teeth 227*a* are formed on an inner peripheral surface of the first retaining member 227 and the ratchet claws 241 are mounted to an outer peripheral surface of the third boss portion 240 of the freewheel 214 (the connecting portion 235). A tip portion of each of the ratchet claws 241 engages with the ratchet teeth 227*a* and a ratchet mechanism, that is, a one-way clutch is configured by the ratchet claws 241 and the ratchet teeth 227*a*.

This configuration enable an advantageous effect to be achieved and the hub body 12 and the freewheel 214 to rotate with respect to the hub axle 11. Also, the freewheel 214 can be configured so as to transmit a rotation of the first rotational direction to the hub body 12, and not to transmit a rotation of the second rotational direction to the hub body 12.

OTHER EMBODIMENTS

The preferred embodiments of the present disclosure have been described above. However, specific constructions are not limited to those described in the aforementioned preferred embodiments, and a variety of changes can be made without departing from the scope of the present disclosure. Especially, the above embodiment and the variations described in the specification can arbitrarily combine with each other according to need.

(a) In this embodiment (including the variations), explanation is performed as an example that the bicycle 1 includes the suspensions, but the configuration of the bicycle 1 are not limited to the above embodiment, and can be change to the other configuration under the condition that the bicycle 1 includes the hub dynamo 10.

(b) In this embodiment (including the variations), explanation is performed as an example that the hub axle 11 is mounted to the tip portion of the swing arm 91 of the bicycle 1. In case that the bicycle 1 doesn't includes the swing arm 91, the hub axle 11 can be mounted to a rear end in which seat stays and chain stays intersect.

(c) In this embodiment (including the variations), explanation is performed as an example that an outer diameter of the second tubular portion 33 is different from an outer diameter of the second boss portion 34 on the freewheel 14, 114 and 214. Instead of this, the outer diameter of the second tubular portion 33 can be the same as the outer diameter of the second boss portion 34 on the freewheel 14, 114 and 214.

(d) In this embodiment (including the variations), explanation is performed as an example that the second tubular portion 33 and the second boss portion 34 of the freewheel 14, 114 and 214 support the rear sprockets 60. Instead of this, the rear sprockets 60 can be disposed only on the second tubular portion 33.

The present invention can be widely applied to a bicycle hub. However, the foregoing descriptions of the embodiments according to the present invention are provided for illustration only, and not for the purpose of limiting the invention as defined by the appended claims and their equivalents.

What is claimed is:
1. A bicycle hub comprising:
a hub axle including a center axis;

a hub body being rotatable around the hub axle;
an electric power generator disposed between the hub axle and the hub body and configured to generate electric power by a relative rotation of the hub axle and the hub body;
a rotating body configured to support a sprocket, connected to the hub body, and being rotatable around the hub axle; and
an electric component including an accommodating portion disposed between the hub axle and the rotating body in a radial direction with respect to the center axis, the electric component being electrically connected to the electric power generator, the electric component including a power storage device housed in the accommodating portion that is configured to store the electric power of the electric power generator.

2. The bicycle hub according to claim 1, wherein the rotating body is configured to transmit a rotation of a first rotational direction to the hub body, and not to transmit a rotation of a second rotational direction to the hub body, the second rotational direction being opposite to the first rotational direction.

3. The bicycle hub according to claim 1, wherein the electric component includes an electronic board.

4. The bicycle hub according to claim 1, wherein the electric component is non-rotatably fixed to the hub axle.

5. The bicycle hub according to claim 1, further comprising:
a rotation detection sensor configured to detect a rotation of the rotating body;
the rotation detection sensor including a detected part and a detection sensor, the detected part being provided on one of the electric component and the rotating body, the detection sensor being provided on the other of the electric component and the rotating body.

6. The bicycle hub according to claim 5, wherein the detected part includes at least one magnet; and
the detection sensor is configured to detect a magnetic force of the magnet.

7. The bicycle hub according to claim 1, wherein the electric power generator includes a stator and a magnet, the stator being configured to integrally rotate with the hub axle, the magnet being configured to integrally rotate with the hub body.

8. The bicycle hub according to claim 1, wherein the rotating body is configured to support a plurality of sprockets.

9. The bicycle hub according to claim 1, wherein the hub body and the rotating body are arranged side by side in an axial direction parallel to the center axis;
the rotating body includes a large diameter portion and a small diameter portion;
the large diameter portion is positioned closer to the hub body than the small diameter portion.

10. The bicycle hub according to claim 9, wherein at least part of the electric component is disposed between the large diameter portion and the hub axle in the radial direction.

11. A bicycle hub comprising:
a hub axle including a center axis;
a hub body being rotatable around the hub axle;
an electric power generator disposed between the hub axle and the hub body and configured to generate electric power by a relative rotation of the hub axle and the hub body;
a rotating body connected to the hub body, being rotatable around the hub axle, and configured to transmit a rotation of a first rotational direction to the hub body, and not to transmit a rotation of a second rotational direction to the hub body, the second rotational direction being opposite to the first rotational direction; and
an electric component including an accommodating portion disposed between the hub axle and the rotating body in a radial direction with respect to the center axis, the electric component being electrically connected to the electric power generator, the electric component including a power storage device housed in the accommodating portion that is configured to store the electric power of the electric power generator.

12. A bicycle hub comprising:
a hub axle including a center axis;
a hub body being rotatable around the hub axle;
an electric power generator disposed between the hub axle and the hub body and configured to generate electric power by a relative rotation of the hub axle and the hub body;
a rotating body configured to support a sprocket, connected to the hub body, and being rotatable around the hub axle;
an electric component disposed between the hub axle and the rotating body in a radial direction with respect to the center axis and electrically connected to the electric power generator;
a first bearing rotatably supporting the hub body with respect to the hub axle; and
a first cable passing in the radial direction through an inner side of the first bearing, and electrically connecting the electric power generator and the electric component to each other.

13. The bicycle hub according to claim 12, wherein the electric component includes a first electrical connector; and
the first electrical connector electrically connected to the electric power generator via the first cable.

14. The bicycle hub according to claim 12, wherein the electric component includes a second electrical connector; and
the second electrical connector electrically connected to the external electrical device via a second cable.

15. The bicycle hub according to claim 14, further comprising:
a third bearing rotatably supporting the rotating body with respect to the hub axle,
the second electrical connector being electrically connected to the external electrical device via the second cable, the second cable passing in the radial direction through an inner side of the third bearing.

16. The bicycle hub according to claim 14, wherein the hub body and the rotating body are arranged side by side in an axial direction parallel to the center axis; and
the second cable extends from inside of the rotating body to outside of the rotating body in a direction away from the hub body.

17. A bicycle hub comprising:
a hub axle including a center axis;
a hub body being rotatable around the hub axle;
an electric power generator disposed between the hub axle and the hub body and configured to generate electric power by a relative rotation of the hub axle and the hub body;

a rotating body configured to support a sprocket, connected to the hub body, and being rotatable around the hub axle;

an electric component disposed between the hub axle and the rotating body in a radial direction with respect to the center axis and electrically connected to the electric power generator;

a bearing rotatably supporting the rotating body with respect to the hub axle; and a first cable passing in the radial direction through an inner side of the bearing, and electrically connecting the electric power generator and the electric component to each other.

18. A bicycle hub comprising:

a hub axle including a center axis;

a hub body being rotatable around the hub axle;

an electric power generator disposed between the hub axle and the hub body and configured to generate electric power by a relative rotation of the hub axle and the hub body;

a rotating body configured to support a sprocket, connected to the hub body, and being rotatable around the hub axle;

an electric component disposed between the hub axle and the rotating body in a radial direction with respect to the center axis and electrically connected to the electric power generator;

a first bearing rotatably supporting the hub body with respect to the hub axle;

a second bearing rotatably supporting the rotating body with respect to the hub axle; and a first cable passing in the radial direction through an inner side of the first and second bearings, and electrically connecting the electric power generator and the electric component to each other.

19. The bicycle hub according to claim 18, wherein the second bearing is disposed in the radial direction on an inner side of the first bearing.

20. A bicycle hub comprising:

a hub axle including a center axis;

a hub body being rotatable around the hub axle;

an electric power generator disposed between the hub axle and the hub body, and configured to generate electric power by a relative rotation of the hub axle and the hub body; and an electric component disposed at an outer side of the hub body in an axial direction parallel to the center axis, and electrically connected to the electric power generator, the electric component including a power storage device, the power storage device configured to store the electric power of the electric power generator.

* * * * *